(12) United States Patent
Campbell (10) Patent No.: US 7,418,915 B2
(45) Date of Patent: Sep. 2, 2008

(54) ENTRAPMENT TUNNEL MONOHULL OPTIMIZED WATERJET AND HIGH PAYLOAD

(75) Inventor: Lorne Frederick Campbell, Dorset (GB)

(73) Assignee: Navatek, Ltd., Honolulu, HI (US)

( * ) Notice: Subject to any disclaimer, the term of this patent is extended or adjusted under 35 U.S.C. 154(b) by 0 days.

(21) Appl. No.: 11/724,172

(22) Filed: Mar. 15, 2007

(65) Prior Publication Data

US 2007/0215029 A1   Sep. 20, 2007

Related U.S. Application Data

(60) Provisional application No. 60/782,278, filed on Mar. 15, 2006.

(51) Int. Cl.
B63B 1/32 (2006.01)
(52) U.S. Cl. ....................... 114/290; 114/288
(58) Field of Classification Search ........ D12/310–312; 114/283, 288–290, 61.2
See application file for complete search history.

(56) References Cited

U.S. PATENT DOCUMENTS

| | | | |
|---|---|---|---|
| 928,579 A | 7/1909 | Apel | |
| 1,559,660 A | 11/1925 | Ward | |
| 1,656,411 A | 1/1928 | Baldwin | |
| 2,020,792 A | 11/1935 | Maynard et al. | 114/66.5 |
| 2,735,392 A | 2/1956 | Cox | 114/62 |
| 2,989,939 A | 6/1961 | Tatter | 114/56 |
| 3,148,652 A | 9/1964 | Canazzi | 114/66.5 |
| 3,203,389 A | 8/1965 | Cale | 114/66.5 |

(Continued)

FOREIGN PATENT DOCUMENTS

DE   29 28 634   11/1980

(Continued)

OTHER PUBLICATIONS

Triton Marine Brochure; copyright 1982; 4 pages.

(Continued)

*Primary Examiner*—Ed Swinehart
(74) *Attorney, Agent, or Firm*—Fitzpatrick, Cella, Harper & Scinto (57) ABSTRACT

An entrapment tunnel watercraft vessel having three hulls consists of a main hull and two amas arranged outboard of the main hull with the keels of the three hulls being parallel. The main hull is a narrow, vee hull with variable, rearwardly decreasing deadrise. The amas have very fine bows and narrow, asymmetric deep-V hulls, with nearly vertical slab outboard sides above their keels and variable reverse deadrise on their inboard sides with the reverse deadrise angles decreasing from bow to stem. The tunnels on each side of the main hull are formed by three distinct surfaces, the sides of the main hull above its chine, the reverse deadrise inboard sides of each ama upward from their keels and a ceiling surface transversely spanning the aforementioned sides and having rearwardly increasing deadrise and rearwardly decreasing width. The tunnel ceilings slopes down from the bow to a section aft of midship where the ceiling height above the keel remains essentially constant. At speed the craft generates substantial amounts of lift and positive trim, thereby reducing the forward wetted length of the immersed tunnel ceiling and the apex of the ceiling is approximately at the craft dynamic waterline. As a result the watercraft vessel has improved seakeeping, stability and weight carrying ability.

44 Claims, 7 Drawing Sheets

U.S. PATENT DOCUMENTS

| | | | |
|---|---|---|---|
| 3,376,840 A | 4/1968 | Zaphiriou et al. | 114/66.5 |
| 3,450,090 A | 6/1969 | Best, Jr. | 115/39 |
| 3,515,087 A | 6/1970 | Stuart | 114/66.5 |
| 3,702,598 A | 11/1972 | Szptyman | 114/67 A |
| 3,709,179 A | 1/1973 | Payne | 114/66.5 |
| 3,760,756 A | 9/1973 | Boden | 114/66.5 |
| 3,796,177 A | 3/1974 | Szpytman | 114/66.5 S |
| 3,937,164 A | 2/1976 | Austin | 114/66.5 |
| D244,841 S | 6/1977 | Nescher | D12/62 |
| D245,902 S | 9/1977 | Rogers | D12/62 |
| 4,091,761 A | 5/1978 | Fehn | 114/290 |
| D252,507 S | 7/1979 | Wood | D12/62 |
| 4,159,691 A | 7/1979 | Paxton | 114/56 |
| 4,263,866 A | 4/1981 | Shirley | 114/271 |
| 4,348,972 A | 9/1982 | Parsons | 114/51 |
| D267,866 S | 2/1983 | Parsons | D12/311 |
| D283,416 S | 4/1986 | Carlson | D12/312 |
| D285,190 S | 8/1986 | Pipkorn | D12/314 |
| D286,870 S | 11/1986 | Fairchild | D12/302 |
| 4,813,366 A | 3/1989 | Elder | 114/61 |
| 4,862,817 A | 9/1989 | Hornsby, Jr. et al. | 114/67 |
| 4,989,534 A | 2/1991 | Field | 114/289 |
| D318,041 S | 7/1991 | Meredith | D12/312 |
| 5,140,930 A | 8/1992 | Lund | 114/291 |
| 5,163,377 A | 11/1992 | Calderon et al. | 114/39.1 |
| 5,191,849 A | 3/1993 | Labrucherie et al. | 114/61 |
| 5,237,953 A | 8/1993 | Mannerfelt | 114/343 |
| 5,265,554 A | 11/1993 | Meredith | 114/290 |
| D355,881 S | 2/1995 | Carlson | D12/314 |
| 5,402,743 A | 4/1995 | Holderman | 114/62 |
| 5,458,078 A | 10/1995 | Perette | 114/288 |
| 5,474,014 A | 12/1995 | Russell | 114/62 |
| 5,544,609 A | 8/1996 | Miller | 114/288 |
| 5,622,130 A | 4/1997 | Caldeorn et al. | 114/39.1 |
| 5,934,218 A | 8/1999 | Chen | 114/288 |
| 6,216,622 B1 * | 4/2001 | Lindstrom et al. | 114/61.33 |
| 6,250,245 B1 | 6/2001 | Robinson | 114/288 |
| 6,345,584 B1 | 2/2002 | Mascellaro | 114/290 |
| 6,526,903 B2 | 3/2003 | Robinson et al. | 114/288 |

FOREIGN PATENT DOCUMENTS

| | | |
|---|---|---|
| DE | 58716 | 3/1981 |
| EP | 0 298 050 | 6/1988 |
| FR | 1.047.765 | 6/1953 |
| FR | 1.083.742 | 6/1954 |
| FR | 2.078.967 | 10/1971 |
| GB | 1 545 900 | 7/1976 |

OTHER PUBLICATIONS

Powerboat Magazine, Sep. 1982; pp. 68-71; p. 98.
Yacht and Boat Owner; Jun. 1981; Vortex a unique design concept; pp. 72-73.
Photograph of boat; admitted prior art.
Practical Boat Owner, Aug. 1983; Get Up And Go!; pp. 50-51.
The Blagg 480 Brochure; undated but admitted prior art.
Something to Blagg About; admitted prior art.
Motor Boat and Yachting Jul. 1978; Blagg 480, p. 85.

* cited by examiner

ENTRAPMENT TUNNEL MONOHULL OPTIMIZED WATERJET AND HIGH PAYLOAD

This application is based on U.S. Provisional Application No. 60/782,278 filed Mar. 15, 2006.

TECHNICAL FIELD

The present invention relates to a watercraft, and more particularly to an engine-powered craft having three parallel hulls with the center of the said three hulls being of a vee form having varying deadrise depending on the purpose of the craft, and two outer hulls, i.e., the amas having considerably greater reverse deadrise facing the deadrise of the center hull and essentially vertical outboard surfaces.

BACKGROUND OF THE INVENTION

Prior art air entrapment tunnel boats including catamarans, air entrapment tunnel monohulls, etc. are designed for the tunnel ceilings to become totally ventilated at design speeds and thereby reduce wetted surface drag while achieving some aerodynamic lift.

Other prior art watercraft, as for example, the Hickman Sea Sled, Boston Whalers, Tri-hulls and cathedral hulls are designed to keep aft portions of their entrapment tunnels at least partially immersed. The majority of these tunnels are rearwardly sloping and in cross section, typically arcuate. Tunnels that were angular were formed by the convergence of the main hull bottom deadrise and ama inboard side deadrise or main hull side deadrise above the chine and ama inboard side. Some tunnels had a distinct third ceiling surface that was usually of constant width in the aft section and were either flat horizontally or had very little deadrise.

Either submerged propellers or waterjets lose efficiency and effectiveness when ventilated and this has been a serious problem with prior art craft of the type described above. Since the tunnels of the craft constructed in accordance with the present invention are not formed by the convergence of the ama and main hull sides or bottom, the tunnel and main hull are treated as separate running bottoms designed to compliment each other to optimize total performance.

BRIEF DESCRIPTION OF THE INVENTION

In accordance an aspect of the present invention, and unlike the prior art, the improved watercraft or boat hull of the present invention incorporates a unique form in which the shape and position of tunnels which separate a main hull and outboard amas is carefully designed not to entrap the vortical flow from the divergent bow wave and spray. The amas are positioned to channel the turbulent flow from the main hull to outboard of the ama leading edge.

In accordance with another aspect of the present invention and unlike the prior art, the tunnel ceilings of the watercraft are designed not to become fully ventilated at design speed and weight. The tunnels are designed to primarily entrap the dynamic pressure from the main and ama hulls at speed, thereby creating greater hull lift. Entrained air from the bow is prevented from flowing into the tunnels.

In the preferred embodiment of the present invention the inboard side of each tunnel is formed from a near vertical main hull side. This side is deep enough above the main hull chine to act as a fence to prevent entrained air in the turbulent tunnel flow from getting under the chine and ventilating the propulsors in the after portion of the main hull. The tunnels are also formed by asymmetric amas with variable rearward decreasing reverse deadrise on the tunnel inboard side with rearward increasing variable deadrise on the tunnel ceiling. This configuration created by the joining of the positive and reverse deadrise sides generates a tunnel ceiling apex that is not flat but pointed and located essentially at a constant height above the keel in the aft 35% of the tunnel. The constant elevation apex is designed to be at the running draft of the craft thereby allowing the tunnel to vent some entrapped pressurized tunnel air at design speed to mitigate impulse pounding in the tunnels that otherwise would cause a "cobblestone ride". The angular shape does not vent excessive amounts of entrapped tunnel fluid that a flat or arcuate tunnel would which could result in less effective tunnel lift at higher speeds.

It is a general object of the present invention to develop a watercraft with great longitudinal and transverse stability, and the ability to carry significant loads at moderate to high speeds.

It is a further object of the invention for the center, or main hull, of the craft to generally have decreasing deadrise rearwardly aft of the bow shape which is designed to advance with minimal turbulence in the water. In alternate embodiments the deadrise of the said center or main hull may remain constant along the length of the hull.

It is still a further object of the invention that the sides of the main hull be parallel and straight from the bow shape aft.

Yet another object of the present invention is that the outboard sides of the main hull are flat and vertical, or nearly so.

A further object of the invention is that two parallel hulls, referred to amas, are arranged such that one ama is positioned outboard of the main hull, and that the keels of the amas are parallel to the keel line of the main hull.

A still further object of the invention is that the form of the hulls of the amas shall be that of an asymmetric deep-vee with the reverse deadrise decreasing toward the transom;

Another object of the present invention is that the amas have bow shapes developed to provide effective and efficient flow along the hull as the craft is propelled through the water.

Yet another object of the invention is that the depth of the keels of the amas are located at a depth that is less than the depth of the keel of the main hull.

A still further object of the invention is that the physical separation of the amas from the main hull defines tunnels in the overall hull of the craft.

Yet another object of the present invention is that at operating speeds the aft areas of the tunnels will remain wetted in operation although dynamic lift and trim effects may ventilate the forward portion of those tunnels.

A still further object of the invention is that the tunnels are so designed that the vertical elevation of the tunnels is approximately at the height of the running waterline of the watercraft.

It is a further object of the invention that the shape of the tunnels reduces or prevents the entrainment of air turbulence beneath the main hull.

It is still a further object of the invention that the shape of the tunnels allows entrapped air pressure to be released and so to reduce transient vertical pressure spikes on the tunnel.

BRIEF DESCRIPTION OF THE DRAWINGS

The above and other objects, features and advantages of the present invention will be apparent in the following detailed description of illustrative embodiments thereof when read in connection with the accompanying drawings, wherein.

DETAILED DESCRIPTION OF THE PREFERRED EMBODIMENTS OF THE INVENTION

Figure 1:
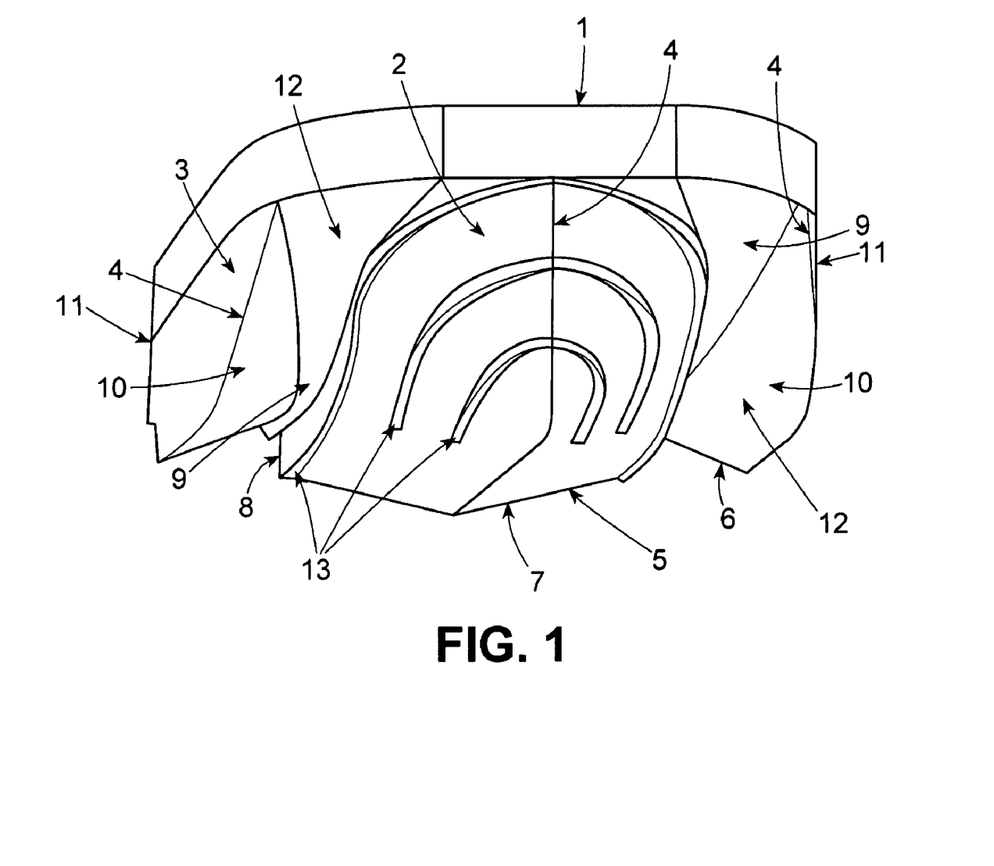
FIG. 1 is an isometric view of the preferred embodiment of a watercraft vessel constructed in accordance with the present invention taken from a point below and forward of the bow.
Figure 8:
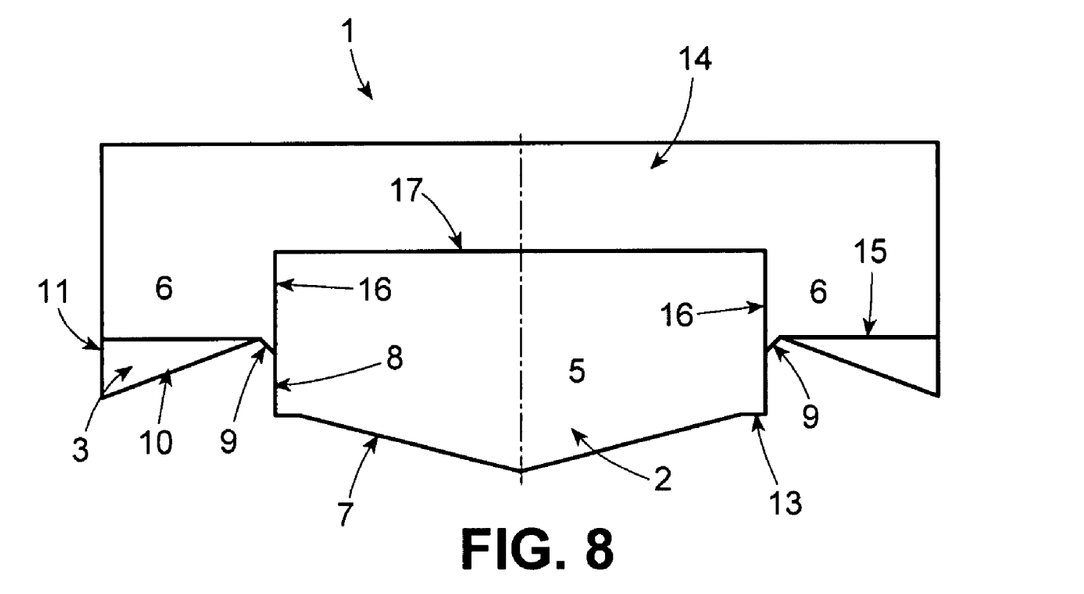
FIG. 8 is a cross-sectional view taken along line E-E of FIG. 2.
Figure 11:
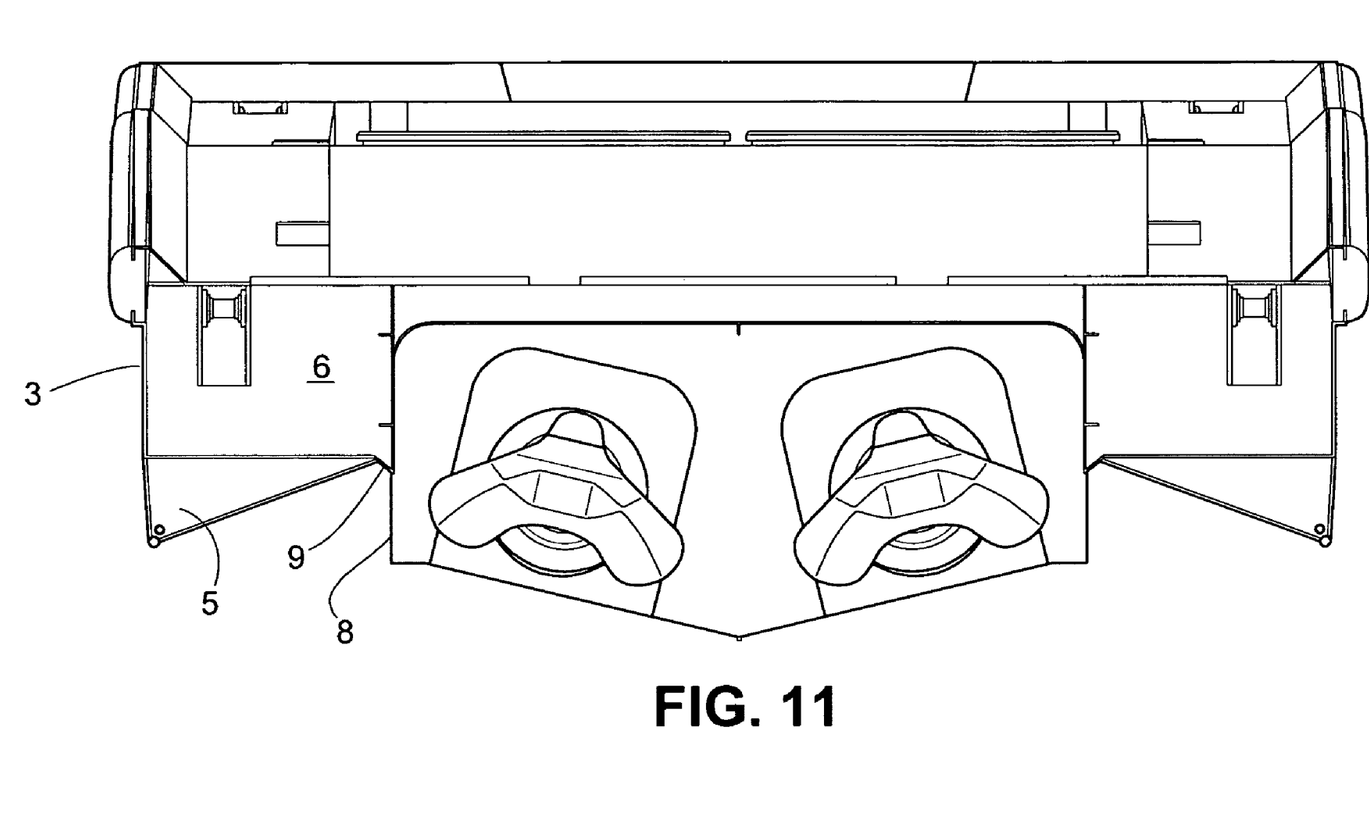
FIG. 11 is a rear view of the watercraft vessel of FIG. 9.

Referring now to the drawings in detail, and initially to FIG. 1, a watercraft vessel 1 constructed in accordance with the present invention is shown which has a main central hull 2, and two outboard amas 3. Main hull 2 and amas 3 each have a bow 4, transoms 5 and 6, respectively (FIGS. 8, 11).

The main hull 2 also has a bottom 7 and sides 8.

Amas 3 each have an inboard surface 10 and outboard side 11. The stability of the watercraft is developed through the length, outboard placement and sizing of the amas. Main hull running bottom 7 provides the primary buoyancy and planing lift to the craft with its variable deadrise and fineness ratio balancing the required usable craft beam, seakeeping, efficiency and lift. The preferred configuration is variable deadrise to allow greater hull loading. The amount of deadrise and its variability is a function of the amount of hull loading required which determines the weight carrying ability of the craft. A monohedron or constant deadrise hull from midship aft is an option to improve ride quality at the expense of weight carrying. The volume of space between the sides 8 of main hull 2 and the inboard sides 10 of the amas 3 defines the respective tunnels 12. The upper surface of each tunnel 12 is defined by a surface 9.

The amas provide the outboard structure which, with hull 2 define the entrapment tunnels and provide limited outboard buoyancy to improve the transverse stability of the craft. The beam and buoyancy of the amas 3 are kept low to prevent excessive excitation moments which could make the craft too stiff in roll. The asymmetric hulls with near vertical outboard sides and high deadrise of deep-V form provide for a fine, wave piercing bow to mitigate slamming and spray. The asymmetric amas hulls produce very little wave making on the outboard side and the wave making from the inboard sides of the amas are directed toward the entrapment tunnels 12. The deep-V deadrise on the inner sides or surfaces 10 of the amas varies along the length of the amas to define variable rearward decreasing inboard deadrise which increases buoyancy of amas 3 as they move aft to support the heavy machinery which is typically located in the after portions of a watercraft.

With respect to other embodiments of the present invention the amas 3 may be longitudinally or transversely stepped to improve dynamic lift and maintain flat running trim; have running strakes to improve lift and/or spray control; have rocker, hook or a straight run in the after section of the ama keel depending on desired running trim and turning maneuverability; have a pad keel; have a stepped transom; or can optionally have plan form taper in the afterbody of the hull.

The preferred bow configuration as shown in the drawings is a moderate forefoot for moderate design speeds. For very high design speeds a cutaway bow would be preferred. For low design speeds a deep forefoot with better wave piercing ride would be preferred.

Figure 9:
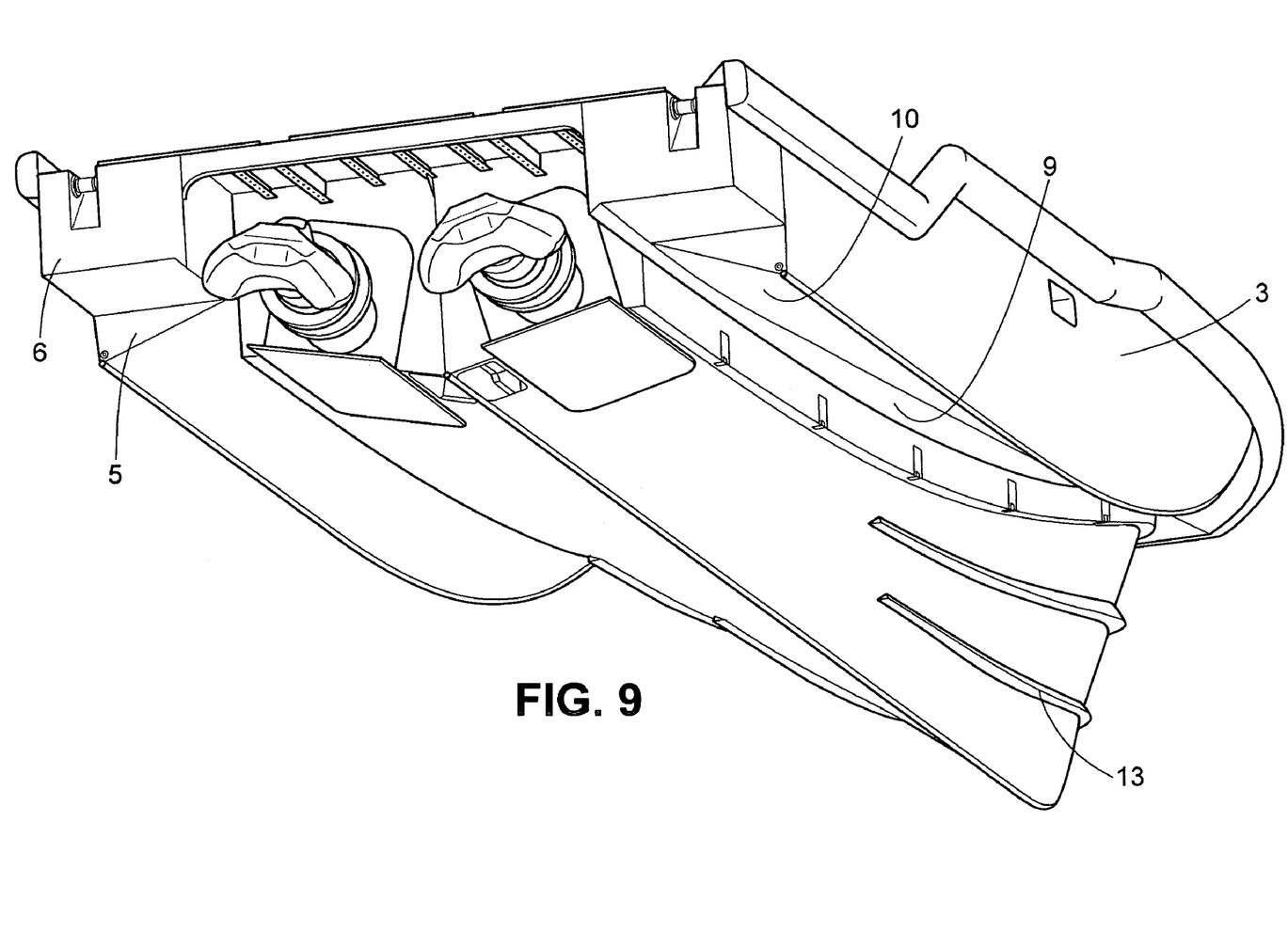
FIG. 9 is a bottom perspective view of a watercraft vessel (from below, aft) of a vessel including a hull form in accordance with the present invention and showing the location of the water inlets to the vessels set drives.
Figure 10:
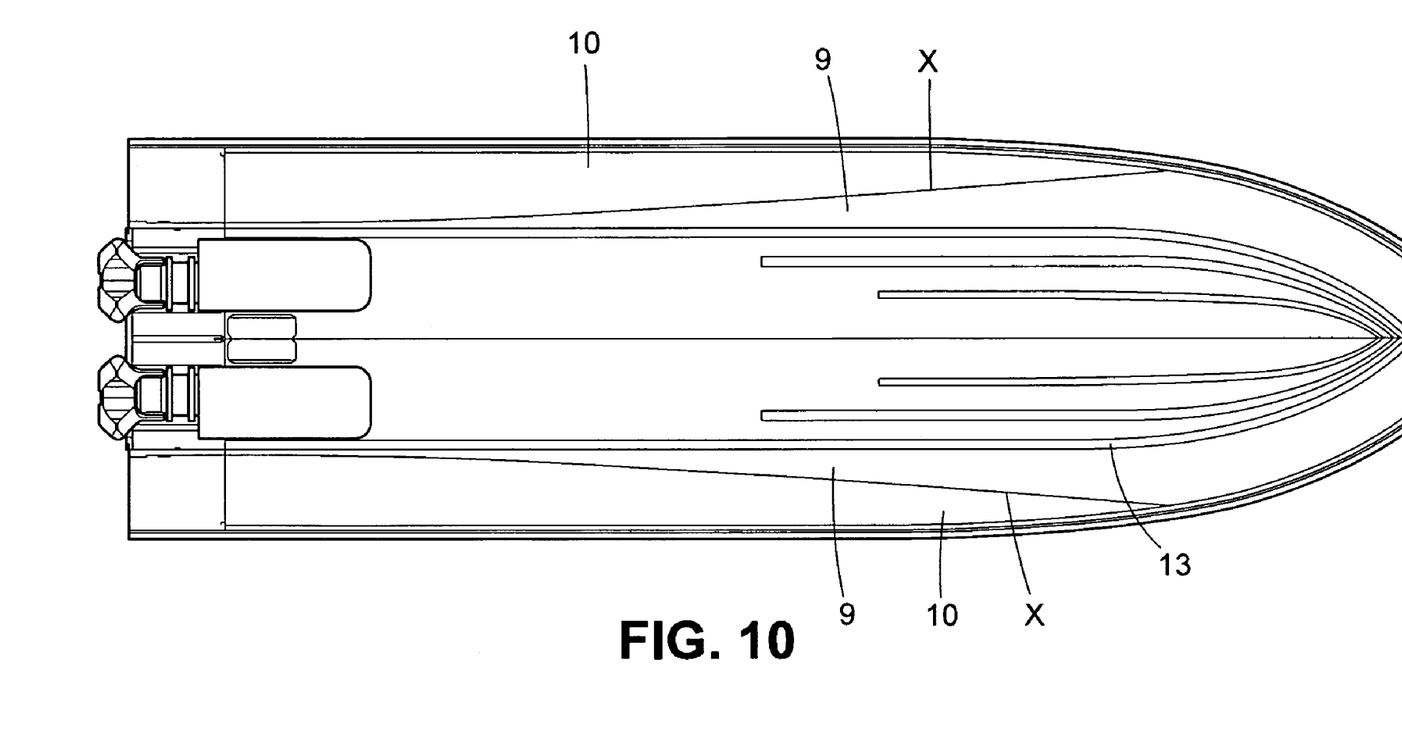
FIG. 10 is a bottom view of the watercraft shown in FIG. 9.

The amas 3 provide exceptional directional stability to allow watercraft vessel 1 to have a beneficial deeper forefoot than a craft without amas might have. Without adequate directional stability, a craft with a deeper forefoot typically has bow steering and broaching problems in following seas. In the preferred embodiment of the present invention three chines or running strakes 13 extend aft from bow 4 partly or entirely to the transom 5 of main hull 2. In the preferred embodiment of the present invention there are two running strakes 13 on the bow which end forward of midship as seen in FIGS. 1 and 9 to provide pitch, damping and spray control while preventing propulsor ventilation. Optionally there can be more, fewer or no running strakes.

Figure 2:
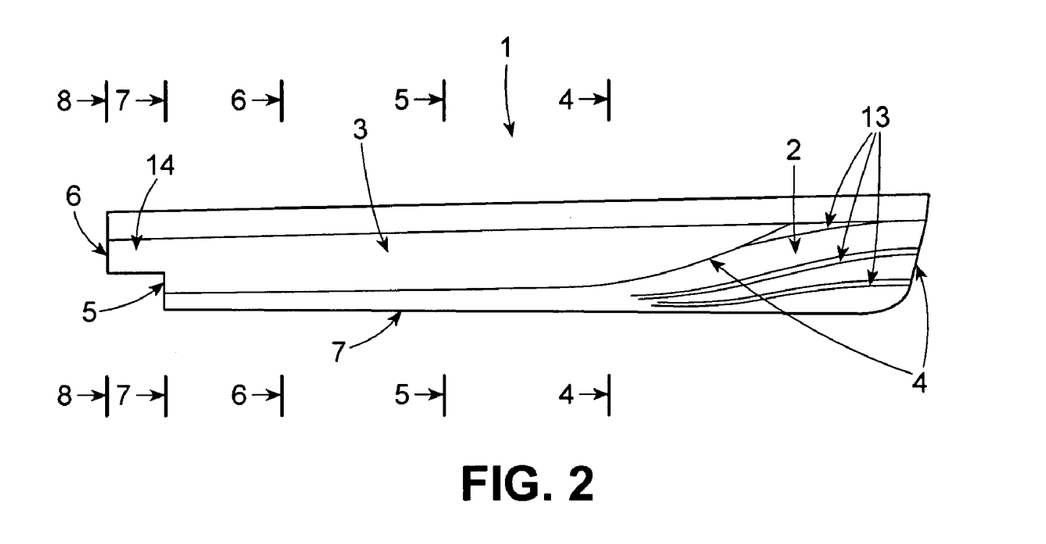
FIG. 2 is a side elevational view of the watercraft vessel shown in FIG. 1.

FIG. 2 is a side view of watercraft vessel 1 showing bow 4, transoms 5 and 6 and ama 3 located outboard of the main hull 2. Chines 13 are illustrated extending aft from bow 4. In the preferred embodiment of the present invention bottom 7 is unstepped to prevent ventilation to the water inlets of a waterjet propulsion system; a longitudinal stepped version of the hull 2, with one or more steps, is optional if waterjet propulsion is not used. Steps reduce drag at high speed and help to control craft trim.

Figure 3:
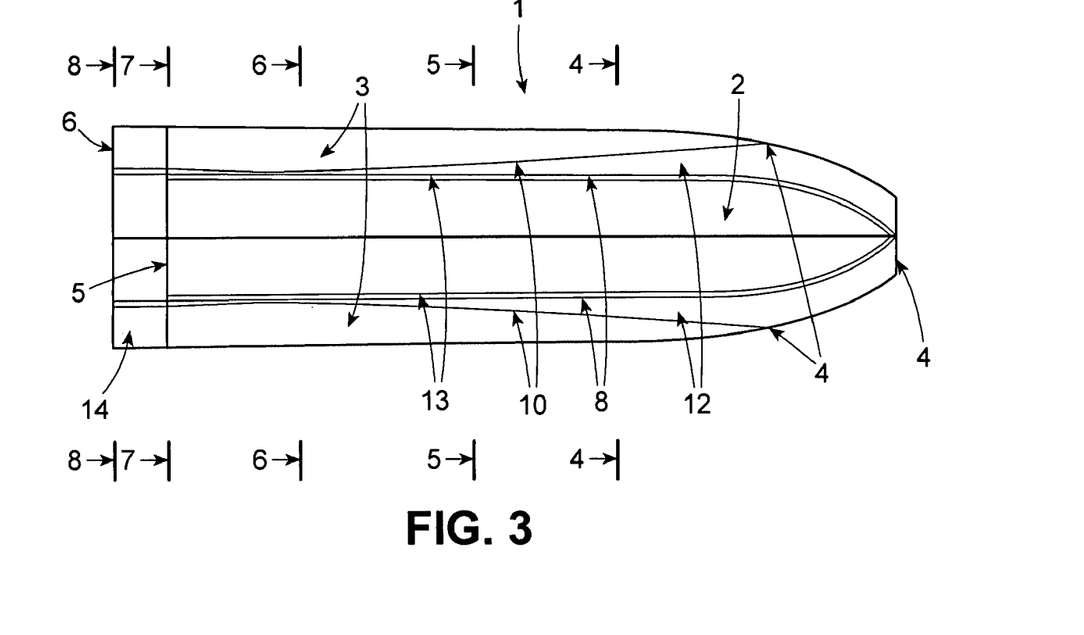
FIG. 3 is bottom view of the watercraft vessel shown in FIG. 1.

FIGS. 2 and 3 show the location of sections or stations A through E taken along the length of the hull and illustrated in FIGS. 4-8.

The after section of the main hull 2 can have rocker or a straight run depending on desired running trim optimization. The main hull keel 4 is more deeply immersed than the ama keel 4 to provide an axis of rotation that causes the craft to bank into a turn. The amas provide righting moments so that the banking is not excessive to allow fairly flat turning.

In other embodiments the main hull 2 also can optionally have a stepped transom, and also can optionally have a pad keel.

Between stations D and E there extends aft of main hull 2 transom 5 a so-called bustle 14 which is further described below. It is clearly apparent from the drawings that the transom 6 of bustle 14 is the same as the transom of the amas 3 as compared with the transom of the main hull through which the waterjet apparatus projects (see FIG. 9).

FIG. 3 illustrates the underside of the watercraft vessel 1 showing the general hull arrangement of the preferred embodiment of the present invention including main hull 2, amas 3, bows 4 of the main hull and amas, the transom 5 or stem 5 of the main hull 2 of the craft and the amas, the outboard sides 8 of main hull 2, the inboard sides 10, amas 3, tunnels 12 and, in this illustration, a single chine 13.

Figure 4:
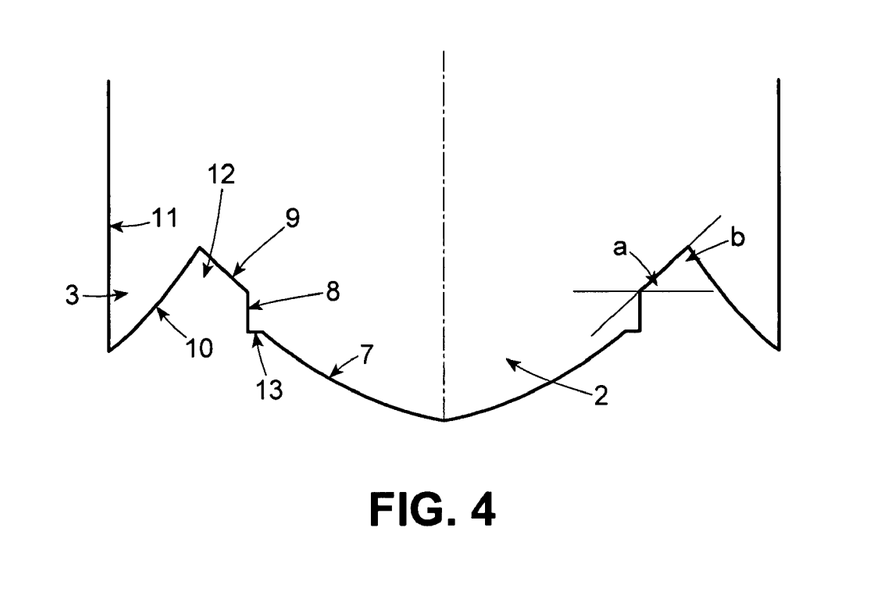
FIG. 4 is a cross-sectional view taken along line A-A of FIG. 2.

FIG. 4 is a schematic cross section of the watercraft vessel 1 taken through the hull at section A-A. This view and the other cross sectional views 5-8 illustrate the relationships at each section of the main hull 2 and amas 3. As seen in FIG. 4, at section A-A bottom 7 of main hull 2 merges through chine 13 to vertical side 8, thence to the surface 9 and to the inboard deadrise surface 10 of ama 3. Surfaces 8, 9, and 10 define tunnel 12. The distinctive characteristic of the present invention is the shape of the ceiling of the tunnel as described by the angle a (which is recognized by those familiar with the art as the deadrise of that portion of the hull), the length of that surface at that station, and, also, by the angle b describing the dihedral between surface 9 and inboard surface 10 of ama 3. In this preferred embodiment of the present invention the watercraft vessel is designed to carry significant payload at lower speeds, and, also, to be able to attain reasonably greater speeds at lighter loading. The angles a and b are important in the design of the tunnels 12. Angle a increases moderately throughout the length of tunnels 12, and angle b changes as a function of the change in width, or deadrise, of the inboard surfaces 10 of amas 3 as the tunnels 12 narrow from bow to stern. The enclosed volumes between the main hull 2 and the two amas 3 comprise the entrapment tunnels 12. That volume is between the amas 3 and main hull sides 8.

For approximately 35% of the hull length forward from transom 5, the rearward sloping entrapment tunnel ceilings are below the craft design waterline at rest. The volume of the immersed hull above the tunnel ceilings provides valuable, additional stern buoyancy and increased longitudinal and transverse stability.

As the craft accelerates to design speeds, the bows of amas 3 are so positioned as to cause the bow wave from the main hull to pass outboard of the amas. The turbulence is further displaced from the hull by the slab outboard sides of the amas. Water flow along the main hull is carried into the tunnels 12.

With increasing speed, increasing lift is generated from the planing forces acting on the main hull and the tunnel surfaces. At higher speeds some turbulence may be captured in the tunnels 12 causing high pressure air to be developed in the tunnels. At maximum design speeds these forces lift the craft so that the tunnel ceiling apex is raised to approximately the height of the dynamic waterline of the watercraft vessel. The tunnel ceiling apex at this height allows high pressure fluid pulses that could develop in the tunnel to vent, thus mitigating the so called "cobblestone ride" that might otherwise occur without the venting.

The tunnel ceiling surface 9 projects from the main hull side 8 with positive deadrise. This configuration puts the ceiling apex further away from the main hull side, minimizing the potential of entrapped air in the tunnels from migrating down the main hull sides to ventilate the main hull bottom.

In other embodiments design variables include the width and varying deadrise of the tunnel ceiling; rocker on the tunnel ceiling; and the continuation of the tunnel ceiling onto a bustle 14 structure aft of the transom 5. In other embodiments of the present invention although the deadrise of the main hull and amas may be increased, the definition of the shape of the roof of the tunnels 12 will remain generally consistent.

The sides 8 of the main hull 2 remain vertical throughout the length of the watercraft 1 aft of the bow shape.

Figure 5:
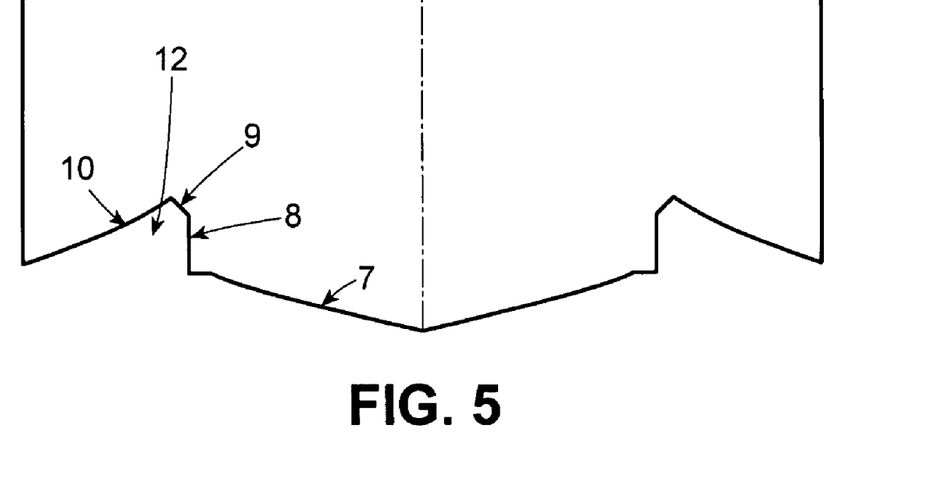
FIG. 5 is a cross-sectional view taken along line B-B of FIG. 2.
Figure 6:
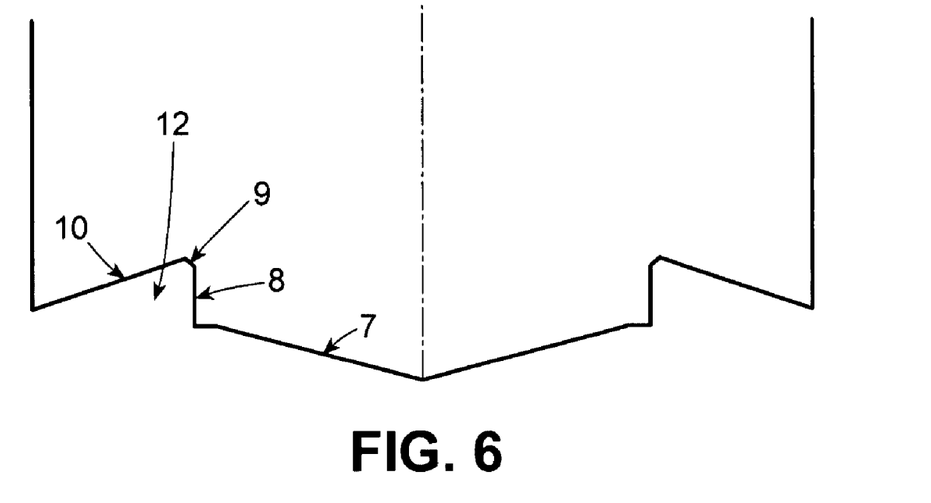
FIG. 6 is a cross-sectional view taken along line C-C of FIG. 2.
Figure 7:
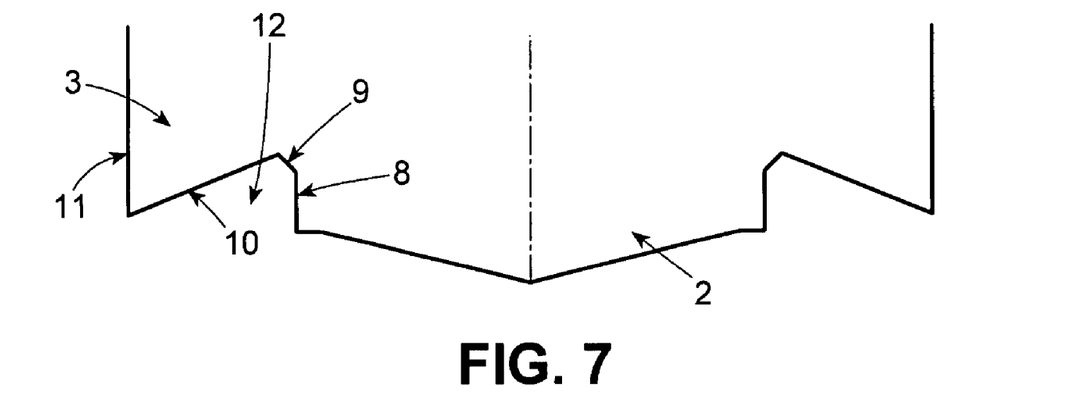
FIG. 7 is a cross-sectional view taken along line D-D of FIG. 2.

FIGS. 5-7 show the schematic cross-sections of watercraft 1 through the sections at B through D, respectively. These figures illustrate the decrease in the inboard reverse deadrise of amas 3 from forward to aft, and the resulting narrowing of the ceiling of tunnels 12 from forward to aft. There is also a decrease in the deadrise of the main hull 2 from section A through D.

FIG. 8 shows the schematic cross section of watercraft 1 through the section E. This section E is superimposed in bold line over the section at D, and also shows the actual transom of the craft 1, the volume between section D and section E describing the bustle 14. The function of bustle 14 that extends aft from transom 5 is to provide protection to the waterjets 20 which emerge from the transom 5 of main hull 2 and are bounded on three sides by the inboard sides 16 and ceiling 17 of the bustle 14.

This is better illustrated in FIG. 9 where it can be seen that inboard side 16 effectively extends the plane of the slab side 8 of main hull 2. The undersides 15 of bustle 14 provide additional running surfaces for the craft and additional buoyancy aft. Further, it is apparent that the surface 9, which, forward of section D, describes the ceiling of the tunnels 12 is continued aft in the bustle 14 to the transom 6. The surface 9 intersects with the inboard vertical surfaces 16 of bustle 14 to develop an edge, the purpose of which is to reduce the transfer of turbulence to the waterjets.

Although an illustrative embodiment of the invention has been described herein it is to be understood that the invention is not limited to the specifically disclosed embodiment(s) but that various damages and modifications may be effected therein by those skilled in the art without departing from the scope or spirit of the invention.

What is claimed is:

1. A watercraft comprising a center hull and a pair of outer side hulls respectively located on opposite sides of the center hull and including outer surfaces forming portions of the outer sides of the watercraft, said center hull having a v-form including varying deadrise from the bow to at least a predetermined point forward of the stem, and said side hulls each having inner surface portions facing the center hull having greater reverse deadrise than the deadrise of the opposing surface of the center hull; said outer surfaces of the side hulls being substantially vertical to the water surface when the hull is at rest and extend to a lower keel; said center hull also having vertical surface portions facing the reverse deadrise surface portions of said outer hulls; and said center hull including a deadrise surface portion on each of its sides extending from said vertical surface portions and intersecting with the reverse deadrise surface portion of its adjacent outer hull, whereby said vertical surface portions, reverse deadrise surfaces and deadrise surface portions define an air entrapment tunnel on each side of the center hull; said lower edges of said outer hulls extending to a greater depth below the waterline than said vertical surface portions of the center hull.

2. A watercraft hull comprising a center hull and a pair of outer side hulls respectively located on opposite sides of the center hull and including outer surfaces forming portions of the outer sides of the watercraft, said center hull having a v-form including varying deadrise from the bow to at least a predetermined point forward of the stern, and said side hulls each having inner surface portions facing the center hull having greater reverse deadrise than the deadrise of the opposing surface of the center hull; said center hull also having vertical surface portions facing the reverse deadrise surface portions of said outer hulls; and said center hull including a deadrise surface portion on each of its sides extending from said vertical surface and intersecting with the reverse deadrise surface portion of its adjacent outer hull, whereby said vertical surfaces, reverse deadrise surfaces and deadrise surface portions define an air entrapment tunnel on each side of the center hull; and wherein the reverse deadrise decreases on said outer hulls from bow to stern.

3. A watercraft as defined in claim 2 wherein said center hull has an at rest design water line.

4. A watercraft as defined in claim 3 wherein said center hull has a keel located relative to the keels of said outer hulls such that the keels of the outer hulls are closer to the design waterline than the keel of the center hull.

5. A watercraft as defined in claim 2 wherein said center hull has a keel located relative to the keels of said outer hulls such that the keels of the outer hulls are closer to the design waterline than the keel of the center hull.

6. A watercraft as defined in either of claims 1 or 4 wherein the center hull and outer hulls include aft transom portions.

7. A watercraft as defined in claim 6 wherein said deadrise portions of the center hull from said transom portion forward for approximately 35% of the length of the center hull is located below said design waterline.

8. A watercraft as defined in either of claims 1 or 2 wherein said deadrise portions of the center hull slope fore to aft.

9. A watercraft as defined in either of claims 1 or 2 wherein the width of said deadrise portions of the center hull decreases fore to aft.

10. A watercraft as defined in either of claims 1 or 2 wherein said reverse deadrise of the inner surface portions of the side hulls slope fore to aft.

11. A watercraft as defined in either of claims 1 or 2 wherein the width of the reverse deadrise inner surface portions of the side hulls increases from fore to aft.

12. A watercraft as defined in either of claims 1 or 2 wherein said center hull includes a plurality of running strakes.

13. A watercraft as defined in claim 12 wherein said running strakes run from the bow of the center hull to a predetermined point amidship.

14. A watercraft as defined in either of claims 1 or 2 wherein said center hull includes a chine adjacent said vertical surface portions.

15. A watercraft as defined in either of claims 1 or 2 wherein said hulls have a bustle extension aft of said transom portions, said bustle extension including a pair of spaced facing vertical surface portions generally aligned with the aft ends of the vertical surface portions of the center hull extending vertically from the water line at which the ends of the deadrise surfaces portions terminate at said transom portions, and a horizontal ceiling portion extending between said spaced vertical portions of the bustle above the watercraft design waterline.

16. A watercraft as defined in claim 15 wherein said bustle extension has running surfaces formed thereon outboard of its spaced vertical surface portions.

17. A watercraft as defined in claim 15 wherein said running surface of the bustle extension includes a deadrise portion corresponding in size and deadrise to the deadrise surface portions of the center hull at the transom and flat surface portion outboard of its deadrise surface portions.

18. A watercraft as defined in either of claims 1 or 2 wherein the center hulls and outer hulls include aft transom portions.

19. A watercraft as defined in claim 1 wherein said center hull has an at rest design water line.

20. A watercraft comprising a center hull and a pair of side hulls respectively located on opposite sides of the center hull, said center hull having a v-form including varying deadrise from the bow to at least a predetermined point forward of the stern, and said side hulls each having inner surface portions facing the center hull having greater reverse deadrise than the deadrise of the opposing surface of the center hull; said center hull having vertical surface portions facing the reverse deadrise surface portions of said outer hulls; said center hull also including a deadrise surface portion on each of its sides extending from said vertical surface and intersecting with the reverse deadrise surface portion of the outer hulls, whereby said vertical surfaces, reverse deadrise surfaces and deadrise surface portions define an air entrapment tunnel on each side of the center hull; said reverse deadrise decreasing on said outer hulls from bow to stem; said center hull having an at rest design water line; and said reverse deadrise of the inner surface portions of the side hulls sloping fore to aft; said center hull including a plurality of running strakes which run from the bow of the center hull to a predetermined point amidship; said hulls having a bustle extension aft of said transom portions, said bustle extension including a pair of spaced facing vertical surface portions generally aligned with the aft ends of the vertical surface portions of the center hull extending vertically from the water line at which the ends of the deadrise surfaces portions terminate at said transom portions, and a horizontal ceiling portion extending between said spaced vertical portions of the bustle above the watercraft design waterline.

21. A watercraft as defined in claim 20 wherein said center hull and outer hulls each have keels below the design waterline with the keels of the outer hulls being closer to the design waterline than the keel of the center hull.

22. A watercraft as defined in claim 21 wherein the center hulls and outer hulls include aft transom portions.

23. A watercraft as defined in claim 22 wherein said deadrise portions of the center hull from said transom portion forward for approximately 35% of the length of the center hull is located below said design waterline.

24. A watercraft as defined in claim 23 wherein said center hull and outer hulls each have keels below the design waterline with the keels of the outer hulls being closer to the design waterline than the keel of the center hull.

25. A watercraft as defined in claim 20 wherein said deadrise portions of the center hull slope fore to aft.

26. A watercraft as defined in claim 20 wherein the width of said deadrise portions of the center hull decreases fore to aft.

27. A watercraft as defined in claim 20 wherein the width of the reverse deadrise inner surface portions of the side hulls increases from fore to aft.

28. A watercraft as defined in claim 20 wherein said center hull includes a chine adjacent said vertical surface portions.

29. A watercraft as defined in claim 20 wherein the center hulls and outer hulls include aft transom portions.

30. A watercraft as defined in claim 20 wherein said bustle extension has running surfaces formed thereon outboard of its spaced vertical surface portions.

31. A watercraft as defined in claim 20 wherein said running surface of the bustle extension includes a deadrise portion corresponding in size and deadrise to the deadrise surface portions of the center hull at the transom and flat surface portion outboard of its deadrise surface portions.

32. A watercraft comprising a center hull and a pair of side hulls respectively located on opposite sides of the center hull, said center hull having a v-form including varying deadrise from the bow to at least a predetermined point forward of the stern, and said side hulls each having inner surface portions facing the center hull having greater reverse deadrise than the deadrise of the opposing surface of the center hull; said center hull including a deadrise surface portion on each of its sides intersecting with the reverse deadrise surface portion of the outer hulls to define an air entrapment tunnel on each side of the center hull; said center hulls and outer hulls include aft transom portions; said hulls having a bustle extension aft of said transom portions, said bustle extension including a pair of spaced facing vertical surface portions generally aligned with the aft ends of the vertical surface portions of the center hull extending vertically from the water line at which the ends of the deadrise surfaces portions terminate at said transom portions, and a horizontal ceiling portion extending between said spaced vertical portions of the bustle above the watercraft design waterline.

33. A watercraft as defined in claim 32 wherein said bustle extension has running surfaces formed thereon outboard of its spaced vertical surface portions.

34. A watercraft as defined in claim 33 wherein said running surface of the bustle extension includes a deadrise portion corresponding in size and deadrise to the deadrise surface portions of the center hull at the transom and flat surface portion outboard of its deadrise surface portions.

35. A watercraft hull as defined in claim 32 wherein the width of the reverse deadrise increases on said outer hulls from bow to stern.

36. A watercraft as defined in claim 35 wherein said center hull has an at rest design water line.

37. A watercraft as defined in claim 32 wherein said center hull and outer hulls each have keels below the design waterline with the keels of the outer hulls being closer to the design waterline than the keel of the center hull.

38. A watercraft as defined in claim 32 wherein the center hulls and outer hulls include aft transom portions.

39. A watercraft as defined in claim 38 wherein said deadrise portions of the center hull from said transom portion forward for approximately 35% of the length of the center hull is located below said design waterline.

40. A watercraft as defined in claim 39 wherein said center hull and outer hulls each have keels below the design waterline with the keels of the outer hulls being closer to the design waterline than the keel of the center hull.

41. A watercraft as defined in claim 32 wherein said deadrise portions of the center hull slope fore to aft.

42. A watercraft as defined in claim 32 wherein the width of said deadrise portions of the center hull decreases fore to aft.

43. A watercraft as defined in claim 32 wherein said center hull includes a chine spaced from the keel of the hull.

44. A watercraft as defined in claim 43 wherein said center hull has vertical surface portions extending upwardly from said chines.

* * * * *

UNITED STATES PATENT AND TRADEMARK OFFICE
CERTIFICATE OF CORRECTION

| | |
|---|---|
| PATENT NO. | : 7,418,915 B2 |
| APPLICATION NO. | : 11/724172 |
| DATED | : September 2, 2008 |
| INVENTOR(S) | : Lorne Frederick Campbell |

It is certified that error appears in the above-identified patent and that said Letters Patent is hereby corrected as shown below:

Column 6, line 26, change "stem" to --stern--.

Signed and Sealed this

Twenty-fourth Day of March, 2009

JOHN DOLL
*Acting Director of the United States Patent and Trademark Office*